US006783839B1

(12) United States Patent
Alpini

(10) Patent No.: US 6,783,839 B1
(45) Date of Patent: Aug. 31, 2004

(54) ELECTROMAGNETIC FIELD DEFLECTING GARMENT

(76) Inventor: Edilio Livio Alpini, Via G. Gavotti 1, IT-27050 Pancarana (Pavia) (IT)

(*) Notice: Subject to any disclaimer, the term of this patent is extended or adjusted under 35 U.S.C. 154(b) by 0 days.

(21) Appl. No.: 09/555,105

(22) PCT Filed: Nov. 23, 1998

(86) PCT No.: PCT/EP98/07556

§ 371 (c)(1), (2), (4) Date: May 24, 2000

(87) PCT Pub. No.: WO99/27807

PCT Pub. Date: Jun. 10, 1999

(30) Foreign Application Priority Data

Nov. 27, 1997 (IT) ........................................ MI97A2638

(51) Int. Cl.[7] .......................... D03D 15/00; B32B 5/14; B32B 23/02; A41B 1/00

(52) U.S. Cl. ....................... 428/192; 2/69; 2/79; 2/115; 2/102; 2/108; 361/212; 442/185; 442/186; 442/222; 442/305; 428/193

(58) Field of Search ................................ 2/69, 79, 115, 2/102, 108; 361/212; 442/185, 186, 222, 305; 428/192, 193

(56) References Cited

U.S. PATENT DOCUMENTS

| | | | | | |
|---|---|---|---|---|---|
| 4,668,545 | A | * | 5/1987 | Lowe | 139/387 R |
| 5,073,984 | A | * | 12/1991 | Tone et al. | 2/102 |
| 5,103,504 | A | * | 4/1992 | Dordevic | 139/425 R |
| 5,715,536 | A | * | 2/1998 | Banks | 2/1 |
| 5,991,922 | A | * | 11/1999 | Banks | 2/69 |
| 6,291,375 | B1 | * | 9/2001 | Allen et al. | 442/308 |
| 6,381,482 | B1 | * | 4/2002 | Jayaraman et al. | 600/388 |

FOREIGN PATENT DOCUMENTS

WO WO 9637647 * 11/1996

* cited by examiner

*Primary Examiner*—Terrel Morris
*Assistant Examiner*—Lynda Salvatore
(74) *Attorney, Agent, or Firm*—Sheridan Ross P.C.

(57) ABSTRACT

An electromagnetic field deflecting garment made up of a dry knitted conductive fabric (2) with conductive filaments (3) disposed in parallel fashion, edged with a lattice conductive fabric (4) with filaments (5) disposed in a criss-crossed pattern, an electrical circuit (10) able to disperse the electromagnetic signal coming from the garment being connected to said fabric (4).

13 Claims, 3 Drawing Sheets

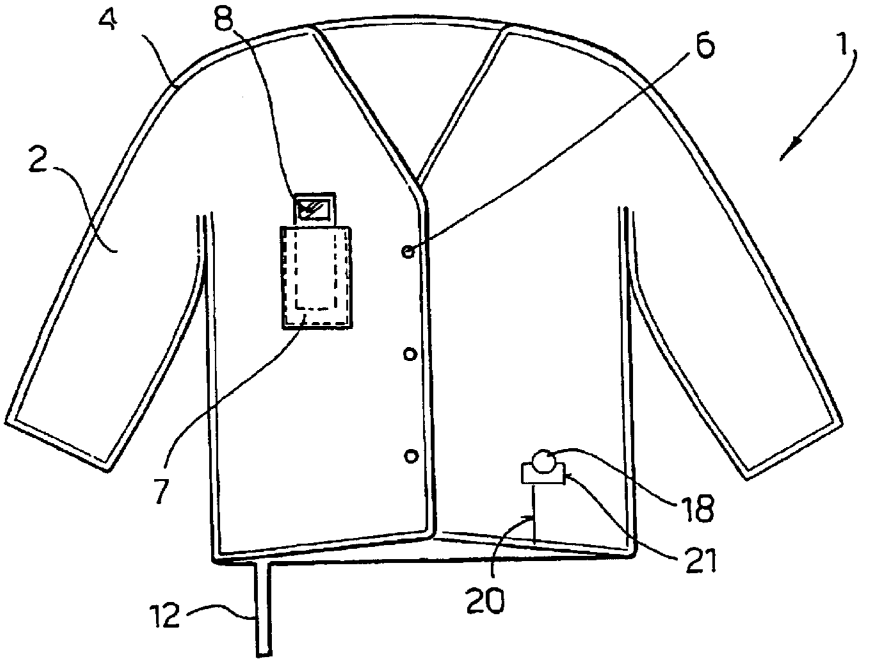
FIG. 1
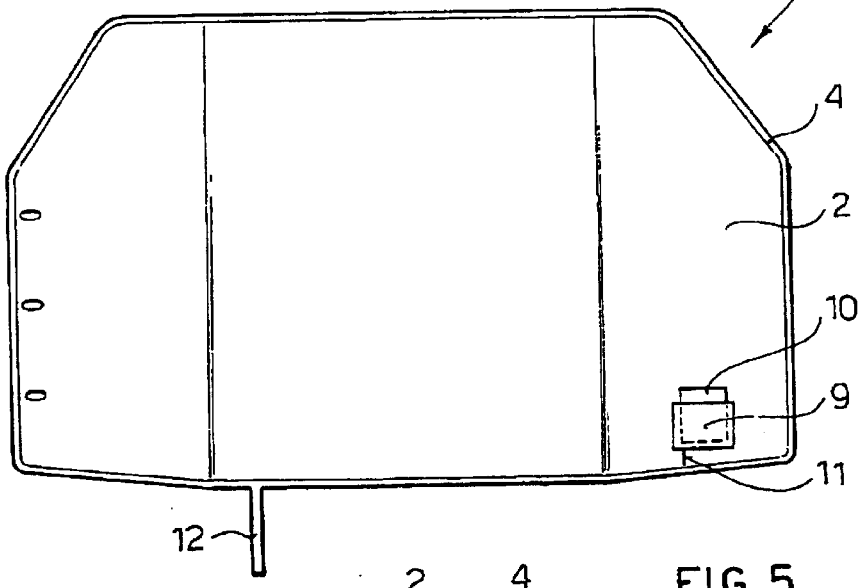
FIG. 2
FIG. 7
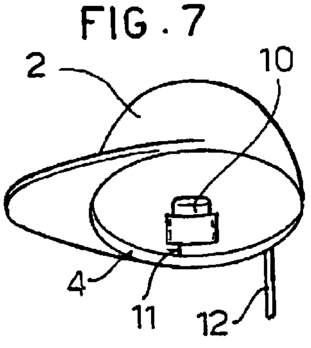
FIG. 5
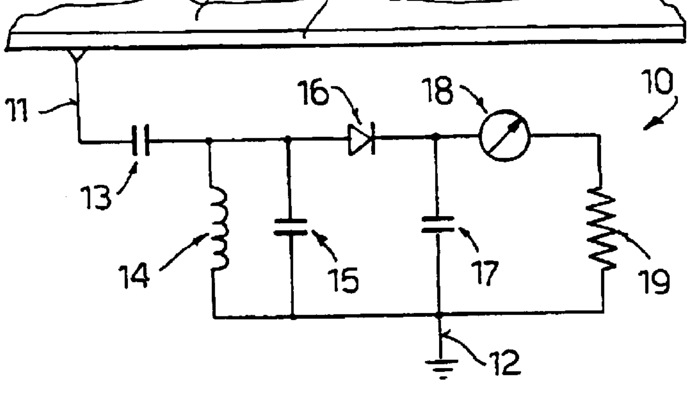

ELECTROMAGNETIC FIELD DEFLECTING GARMENT

FIELD OF THE INVENTION

The present invention concerns a garment capable of deflecting electromagnetic fields arising from outside sources.

BACKGROUND OF THE INVENTION

At present there are no examples in the clothing field of garments that deflect 5 electromagnetic fields.

The need to produce this type of garment has arisen recently precisely because the quantity of electromagnetic waves to which the human body is exposed has risen considerably.

In the home environment we are continually bombarded by electromagnetic fields originating from radio transmitters and receivers that propagate waves in the radiofrequency range, from liquid crystal displays of various items of electronic equipment and above all phosphorus screens of televisions that transmit electromagnetic waves at a frequency concentrated around 900 GHz.

In the working environment we are often obliged to stay constantly in front of the monitor of a computer which, like a television set, transmits electromagnetic waves at a frequency around 900 GHz.

Outdoors it often happens that we pass near high voltage power cables and these too give off electromagnetic waves. Furthermore, there has recently been a strong development of the GSM cellular telephone network resulting in a considerable spread in the use of cellular telephones and these also emit electromagnetic waves around a frequency of 15 GHz.

Recent medical studies have ascertained that any charge of an electrical or electromagnetic nature that is absorbed the human body impairs the cellular balance of the chondrioma. The chondrioma is a cellular structure formed by the chondriosomes which are cytoplasmic bodies in the form of granules, filaments and rods thought to be responsible for a major part of cell physiology.

The human body initially reacts by compensating for the cellular imbalances in the chondrioma caused by electromagnetic radiation, but in the long term these imbalances are no longer compensated and this causes poor cell physiology with consequent harmful effects on human health.

The object of the invention is to prevent such problems, providing a garment that is simple to make.

SUMMARY OF THE INVENTION

This object is achieved according to the invention, which provides, in one aspect, an electromagnetic field deflecting garment, comprising:

- a conducting fabric edged with a lattice fabric;
- an electronic circuit operably interconnected to said conducting fabric and said lattice fabric to form a closed circuit, wherein said electronic circuit is operable to dispel an electromagnetic signal received at said garment through a Joule effect.

Preferred embodiments of the invention appear from the dependent claims.

The garment according to the invention is made by means of a lattice-pattern conductive fabric -connected to an electronic circuit Said conductive fabric absorbs the electromagnetic fields and directs them towards the electronic circuit where they are dissipated through the Joule effect. The garment can act as a sort of Faraday cage discharging the electromagnetic signal to ground. The ground must obviously be understood as a virtual ground, since grounding of the circuit is achieved by means of a connection thereof to a cord of conductive material, acting as a groundplate.

Any parallel resonator characterized by a high cutting frequency so as to act as a low-pass filter and cut off all the signals at a frequency above said cutting frequency can be used as the electronic circuit.

It is possible to connect a micro-amperometer to the circuit capable of providing a measurement of the electromagnetic field present in whatever point the user happens to be. The user thus knows when his garment is absorbing and deflecting an electromagnetic field and knows the magnitude of said field.

Said garment is particularly useful for users who spend long periods in front of a television screen or who for reasons of work are subjected to the radiation of a computer monitor.

Furthermore the garment according to the invention can have a pocket especially for holding a cellular telephone so as to protect the user from the magnetic fields given off by said telephones.

Further characteristics of the invention will be made clearer by the detailed description that follows, referring to a purely exemplary and therefore non-limiting embodiment thereof, illustrated in the appended drawings, in which:

BRIEF DESCRIPTION OF THE DRAWINGS

FIG. 1 shows a plan view of a jacket according to the invention;

FIG. 2 shows a plan view of the jacket in FIG. 1 open;

FIG. 5 shows the electrical diagram of an electronic circuit according to the invention;

FIG. 7 shows an axonometric view of a further embodiment of the invention.

Figure 3:
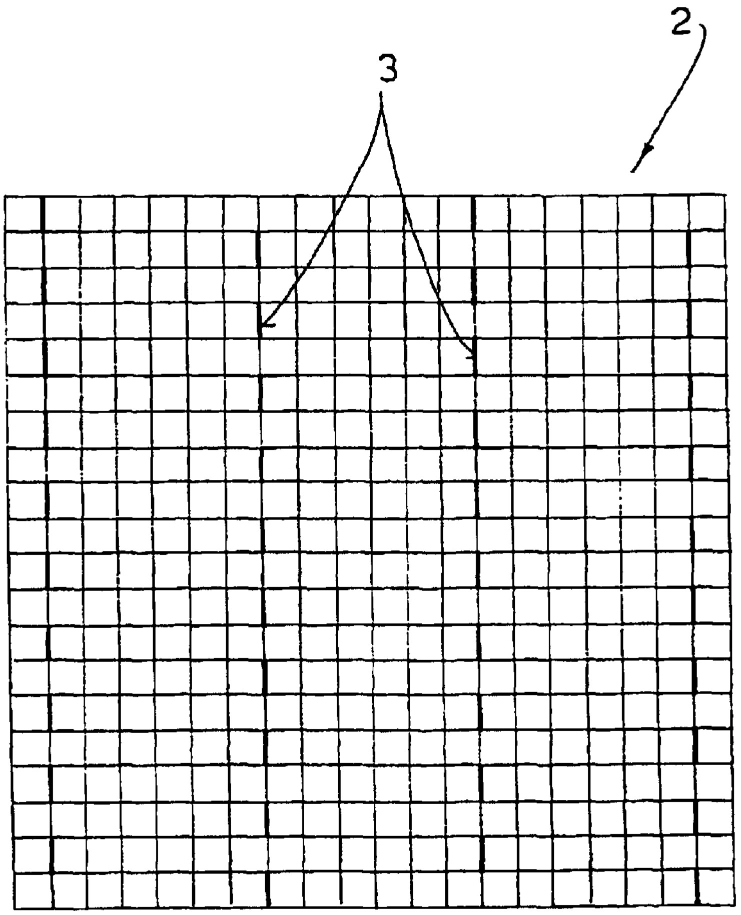
FIG. 3 shows a plan view of a detail of a fabric of the jacket in FIG. 1.
Figure 4:
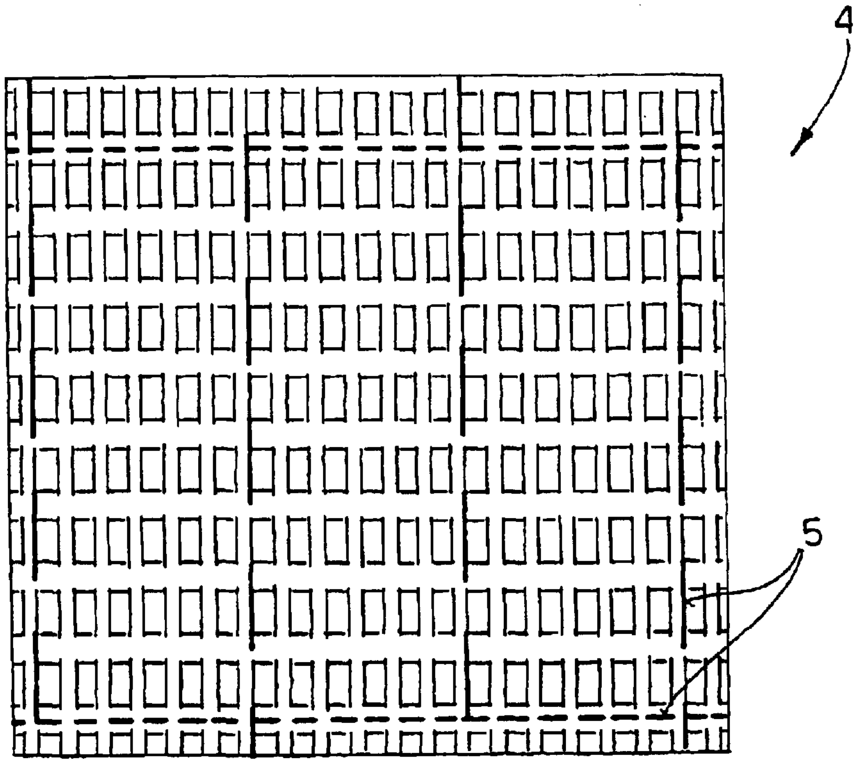
FIG. 4 shows a plan view of a detail of the edging weave of the jacket in FIG. 1.

The garment according to the invention is described with the aid of the figures.

DETAILED DESCRIPTION

Reference is made purely by way of example to a magnetic field deflecting jacket 1, consisting of dry, conductive knitted fabric 2. Filaments 3 of conductive material which can preferably be tungsten and carbon are woven parallel into the weave of said fabric 2. Said filaments 2 are able to conduct the electromagnetic fields that gather on the jacket 1.

The jacket 1 is edged around the perimeter with a crisscrossed lattice fabric 4. The fabric 4 has crisscrossed lattice filaments 5. The filaments 5 must be made of conductive material, preferably tungsten and carbon. The crisscrossed lattice fabric 4 is disposed on the edge of the jacket 1 and is folded over, being made of a thicker and closer weave than fabric 2 and serves to close the conductive circuit that has been created in the jacket 1.

The jacket 1 can also be covered with a nonconductive material at said edging; purely by way of example velvet can be used as the covering material for the edging. The jacket 1 can be made in a single block or can have closing means such as buttons 6 or zips.

A pocket 7 made of conductive fabric can be made on the inside or on the outside of the jacket 1. Said pocket 7 can preferably be of such a size as to contain a mobile telephone 8 according to the shapes and size most commonly used commercially or any other object of a similar size.

An electronic circuit 10 is positioned in a special housing 9 that can be made inside the jacket 1 so that the circuit 10 is hidden. The circuit 10 is connected by means of a conductor wire 11 to the edging fabric 5 of the jacket 1. Grounding of the circuit is obtained by means of a cord 12 made of conducting material, preferably copper. The cord 12 is made to hang from the jacket 1, so as to be able to discharge the electromagnetic field present on the jacket 1.

The electronic circuit 10 can be any parallel resonator circuit with a specific cutting frequency and resonance frequency. Said circuit 10 must be able to disperse the electromagnetic signal coming from the jacket 1 through a Joule effect and must be able to cut off the signals above its cutting frequency.

FIG. 5 shows a possible embodiment of the electrical diagram of the circuit 10. A coupling capacitance 13 is positioned between the edging fabric 4 and the parallel resonator circuit. The parallel resonator consists of the connection in parallel of an inductance 14, two capacitances 15, 17 and a resistance 19. The two capacitances 15 and 17 are decoupled by means of a diode 16 for stabilization of the supply to the circuit 10. A micro-amperometer 18 is connected between the capacitance 17 and the resistance 19.

Said micro-amperometer 18, more or less the size of a wrist watch, can be digital or analogic and is positioned ins special housing 21 made in the outer part of the jacket so as to be visible to the user, and is connected to the electronic circuit 10 by means of connecting cables 20. The user can thus read the intensity of the electromagnetic field absorbed by the jacket 1 at any time.

The resistance 19 must preferably be chosen with a very high value, about 2 MΩ, in order to be able to disperse the electromagnetic signal coming from the jacket through a Joule effect. The power dispersed by said resistance 19 is in the order of nano Joules. This leads to a minimal increase in temperature, quantifiable as about half a degree centigrade.

The coupling capacitance 13 can be chosen with a value of about 100 pF. The capacitances 15, 17 of the resonator can be chosen respectively with a value of 20 pF and 10 $\mu$F, so that their parallel gives a capacitance of about 20 pF. For the stabilizing diode 16 a commercially available model 1N32A can be used. The inductance 14 of the parallel resonator can be chosen with a value of 10 $\mu$H.

Figure 6:
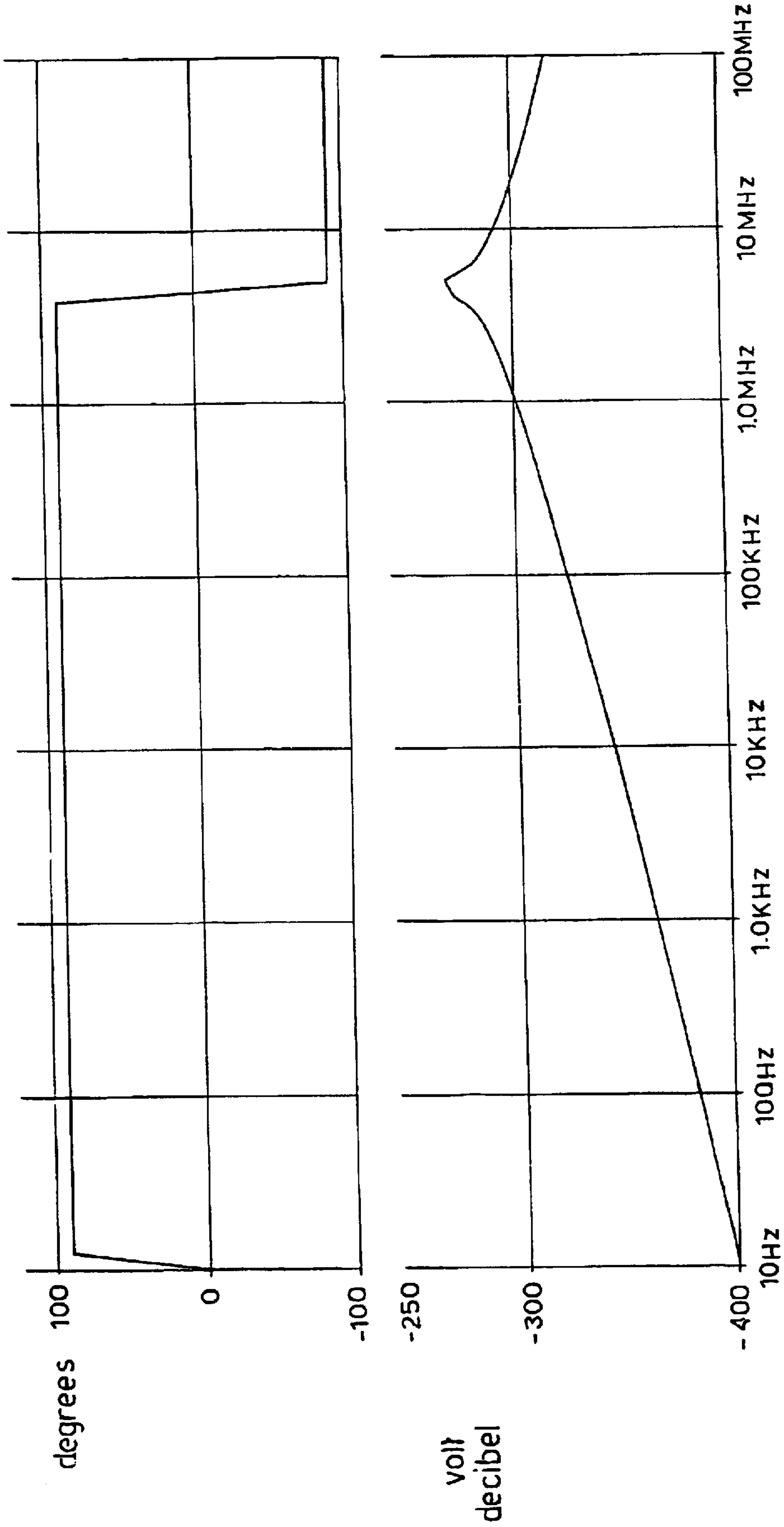
FIG. 6 shows a phase diagram and a diagram of the voltage gain according to the frequency of the electronic circuit in FIG. 5.

In FIG. 6 a phase diagram of the circuit according to the frequency and a diagram of the voltage gain according to the frequency are shown. Said diagrams are obtained as the output taken on the resistance 19 when a sinusoidal signal with a frequency of 1 kHz is given as the input to the circuit. From the phase diagram two changes of phase can be noted, with a phase shift of 90° around 10 Hz and a phase shift of 180° around 7 MHz.

From the voltage gain diagram we see a peak around 7 MHz, the frequency that corresponds to the cutting frequency of the circuit. Below this cutting frequency of the circuit the signals coming from the jacket 1 are filtered FIG. 7 shows a farther embodiment of the invention represented by a hat made of the knitted conducting fabric 2 and an edging made of the conducting lattice fabric 4. The electronic circuit 10 connected by means of the conducting wire 11 to the edging of the hat is positioned inside said hat. A cord 12 hangs from said circuit and acts as the ground.

This embodiment is particularly effective in the case of use of cellular telephones. In fact by wearing the hat according to the invention while communicating with the cellular telephone near the ear, the electromagnetic fields coming from the phone are deflected.

What is claimed is:

1. An electromagnetic field deflecting garment, comprising:

a conducting fabric edged with a lattice fabric having conductive filaments which serve to close a conductive circuit between said conducting fabric and said lattice fabric; and an electronic circuit interconnected through a conductor to said lattice fabric, wherein said electronic circuit is operable to substantially completely dispel an electromagnetic signal coming from said garment through a Joule effect, wherein said electronic circuit is a parallel resonator at a predetermined cutting frequency and predetermined resonance frequency.

2. A garment according to claim 1, wherein said conducting fabric is a knitted fabric with filaments consisting of conductive material disposed parallel to each other.

3. A garment according to claim 1, wherein said lattice fabric has filaments of conductive material disposed in a lattice wherein at least one filament of conductive material is arranged in a perpendicular orientation relative to the remaining filaments of conductive material.

4. A garment according to claim 1, wherein said parallel resonator consists of the connection in parallel of an inductance, a first and a second capacitance decoupled by a diode, and a resistance, said parallel resonator being coupled to the conductive fabric by means of a coupling capacitance.

5. A garment according to claim 4, wherein said inductance is about 10 $\mu$H, the first capacitance is about 20 pF, the second capacitance is about 10 $\mu$F, the diode is the model 1N32A, the resistance is about 2 MΩ and the coupling capacitance is about 100 pF.

6. A garment according to claim 1, wherein grounding of the electronic circuit is achieved by means of a cord protruding from the garment and made of conductive material.

7. A garment according to claim 1, wherein a microamperometer is connected to said electronic circuit allowing the intensity of the electromagnetic field absorbed by the garment to be displayed.

8. A garment according to claim 1, wherein said garment is a jacket.

9. A garment according to claim 8, wherein said jacket comprises a housing to hold objects, a housing to contain the microamperometer and a housing to contain the electronic circuit.

10. A garment according to claim 1, wherein said garment is a hat.

11. A garment according to claim 10, wherein said electronic circuit is positioned inside the hat.

12. A garment according to claim 1, wherein said predetermined cutting frequency is about 7 MHZ.

13. A garment according to claim 1, wherein said electronic circuit is operable to substantially completely dispel said electromagnetic signal independently of any other connections to said garment.

* * * * *